United States Patent
Kumar et al.

(10) Patent No.: US 11,424,962 B2
(45) Date of Patent: Aug. 23, 2022

(54) MODEL DISCOVERY AND SELECTION FOR COOPERATIVE MACHINE LEARNING IN CELLULAR NETWORKS

(71) Applicant: QUALCOMM Incorporated, San Diego, CA (US)

(72) Inventors: Rajeev Kumar, San Deigo, CA (US); Xipeng Zhu, San Diego, CA (US); Shankar Krishnan, San Diego, CA (US); Mutaz Zuhier Afif Shukair, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/111,346

(22) Filed: Dec. 3, 2020

(65) Prior Publication Data

US 2022/0182263 A1 Jun. 9, 2022

(51) Int. Cl.
*H04L 12/54* (2022.01)
*H04W 88/14* (2009.01)
(Continued)

(52) U.S. Cl.
CPC .......... *H04L 12/5601* (2013.01); *G06N 3/02* (2013.01); *H04W 28/18* (2013.01); *H04W 88/14* (2013.01); *H04L 2012/5625* (2013.01)

(58) Field of Classification Search
CPC ........ H04L 12/5601; H04L 2012/5625; G06N 3/02; H04W 28/18; H04W 88/14
See application file for complete search history.

(56) References Cited

U.S. PATENT DOCUMENTS

2016/0165478 A1* 6/2016 Yao ..................... H04W 28/021
370/236
2016/0342955 A1* 11/2016 Brock ..................... H04L 67/02
(Continued)

OTHER PUBLICATIONS

"3rd Generation Partnership Project, Technical Specification Group Services and System Aspects, Study on Enablers for Network Automation for the 5G System (5GS), Phase 2 (Release 17)", Draft, SP-200971.Zip, 3rd Generation Partnership Project (3GPP), Mobile Competence Centre, 650, Route Des Lucioles, F-06921 Sophia-Antipolis Cedex, France, Nov. 30, 2020 (Nov. 30, 2020), 390 Pages, XP051963813, URL : https://www.3gpp.org/ftp/tsg_sa/TSG_SA/TSGs_90E_Electronic/Docs/SP-200971.zip, 23700-91_Diff-v100-v200.zip, 23700-91_Diff_v100-v200.docx.
(Continued)

*Primary Examiner* — Kibrom T Hailu
(74) *Attorney, Agent, or Firm* — Procopio, Cory, Hargreaves & Savitch LLP

(57) ABSTRACT

An OAM core network may receive a request for a ML/NN model and features associated with a ML/NN procedure. The OAM core network may determine a latest update to the ML/NN model and features based on the request and generate a response to the request indicative of the latest update to the ML/NN model and features. In aspects, a base station may initiate the request for the ML/NN model and features by transmitting the request for the ML/NN model and features to the OAM core network. The base station may receive the generated response of the OAM core network based on the transmitted request. In further aspects, a UE may initiate the request for the ML/NN model and features by transmitting the request to the base station, where the UE may receive the ML/NN model and features from the base station based on the transmitted request.

50 Claims, 13 Drawing Sheets

(51) Int. Cl.
  *G06N 3/02* (2006.01)
  *H04W 28/18* (2009.01)
  *H04L 12/70* (2013.01)

(56) References Cited

U.S. PATENT DOCUMENTS

| | | | |
|---|---|---|---|
| 2017/0344910 A1* | 11/2017 | Wu | G06N 20/00 |
| 2019/0394812 A1* | 12/2019 | Kuo | H04W 4/70 |
| 2020/0053591 A1* | 2/2020 | Prasad | G06N 3/0445 |
| 2020/0160207 A1* | 5/2020 | Song | G06F 11/3006 |
| 2020/0285891 A1 | 9/2020 | Yellin et al. | |
| 2021/0281662 A1* | 9/2021 | Mathur | G06F 9/45558 |
| 2021/0345134 A1* | 11/2021 | Ottersten | H04W 40/18 |

OTHER PUBLICATIONS

"3rd Generation Partnership Project Technical Specification Group Services and System Aspects, Study on Traffic Characteristics and Performance Requirements for AI/ML Model Transfer in 5GS (Release 18)", Draft, S1-204352, 3rd Generation Partnership Project (3GPP), Mobile Competence Centre, 650, Route Des Lucioles, F-06921 Sophia-Antipolis Cedex, France, Nov. 30, 2020 (Nov. 30, 2020), 65 Pages, XP051963920, URL: https://www.3gpp.org/ftp/tsg_sa/WG1_Serv/TSGS1_92_Electronic_Meeting/Docs/S1-204352.zip, [retrieved on Nov. 30, 2020].

China Mobile., et al., "KI#2, Sol#24: Update to Federated Learning among Multiple NWDAF Instances", 3GPP Draft, S2-2008025, 3rd Generation Partnership Project (3GPP), Mobile Competence Centre, 650, Route Des Lucioles, F-06921 Sophia-Antipolis Cedex, France, vol. SA WG2, No. e-Meeting, Oct. 12, 202-Oct. 23, 2020, Oct. 25, 2020 (Oct. 25, 2020), pp. 1-10, XP051948223, Retrieved from the Internet: URL : https://www.3gpp.org/ftp/tsg_sa/WG2_Arch/TSGS2_141e_Electronic/INBOX/S2-2008025.zip [retrieved on Oct. 25, 2020], The whole document.

International Search Report and Written Opinion—PCT/US2021/053414—ISA/EPO—dated Jan. 25, 2022.

* cited by examiner

MODEL DISCOVERY AND SELECTION FOR COOPERATIVE MACHINE LEARNING IN CELLULAR NETWORKS

BACKGROUND

Technical Field

The present disclosure relates generally to communication systems, and more particularly, to model discovery and selection for cooperative machine learning (ML) in cellular networks.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may transmit, to an interface of the core network, a request for at least one of a model or features associated with at least one of a machine learning (ML) procedure or a neural network (NN) procedure; determine, via the interface of the core network, the at least one of the model or the features based on the request, the at least one of the model or the features corresponding to a latest update to the at least one of the model or the features; and receive, from the interface of the core network, a response to the request for the at least one of the model or the features, the response to the request indicative of the latest update to the at least one of the model or the features.

In a further aspect of the disclosure, a method, a computer-readable medium, and an apparatus are provided. The apparatus may determine to initiate a request for at least one of a model or features associated with at least one of a ML procedure or a NN procedure; transmit the request to a core network; and receive, from the core network based on the request, the at least one of the model or the features, the at least one of the model or the features corresponding to a latest update to the at least one of the model or the features.

In yet a further aspect of the disclosure, a method, a computer-readable medium, and an apparatus are provided. The apparatus may transmit, to a base station, a request for at least one of a model or features associated with at least one of a ML procedure or a NN procedure; and receive, from the base station, the at least one of the model or the features based on the request, the at least one of the model or the features corresponding to a latest update to the at least one of the model or the features.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
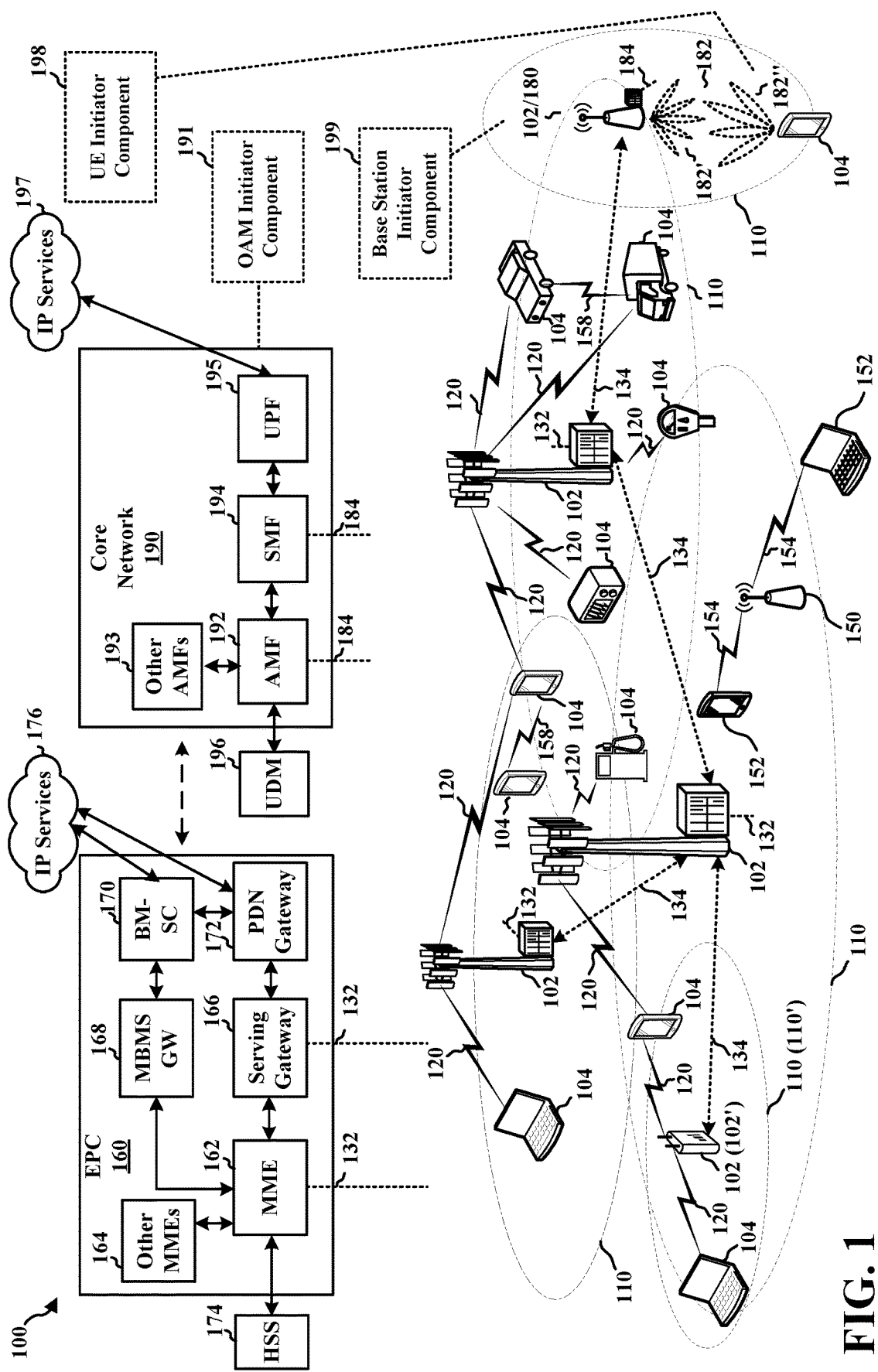
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the core network 190 may include an operation and management (OAM) initiator component 191 configured to transmit, to an interface of the core network, a request for at least one of a model or features associated with at least one of a machine learning (ML) procedure or a neural network (NN) procedure; determine, via the interface of the core network, the at least one of the model or the features based on the request, the at least one of the model or the features corresponding to a latest update to the at least one of the model or the features; and receive, from the interface of the core network, a response to the request for the at least one of the model or the features, the response to the request indicative of the latest update to the at least one of the model or the features. In certain aspects, the base station 180 may include a base station initiator component 199 configured to determine to initiate a request for at least one of a model or features associated with at least one of a ML procedure or a NN procedure; transmit the request to a core network; and receive, from the core network based on the request, the at least one of the model or the features, the at least one of the model or the features corresponding to a latest update to the at least one of the model or the features. In certain aspects, the UE 104 may include a UE initiator component 198 configured to transmit, to a base station, a request for at least one of a model or features associated with at least one of a ML procedure or a NN procedure; and receive, from the base station, the at least one of the model or the features based on the request, the at least one of the model or the features corresponding to a latest update to the at least one of the model or the features. Although the following description may be focused on 5G NR, the concepts described herein may be applicable to other similar areas, such as LTE, LTE-A, CDMA, GSM, and other wireless technologies.

Figure 2:
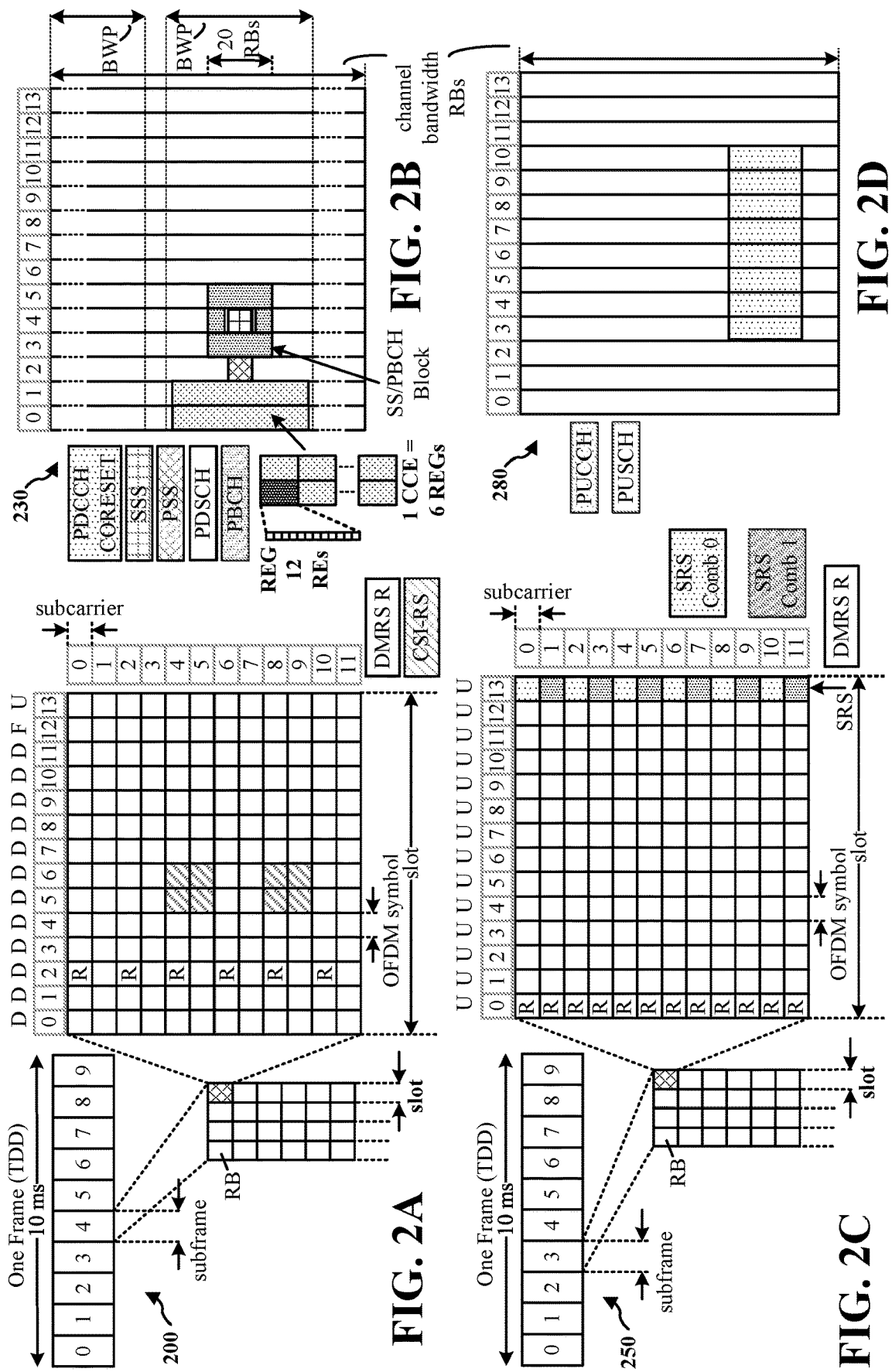
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
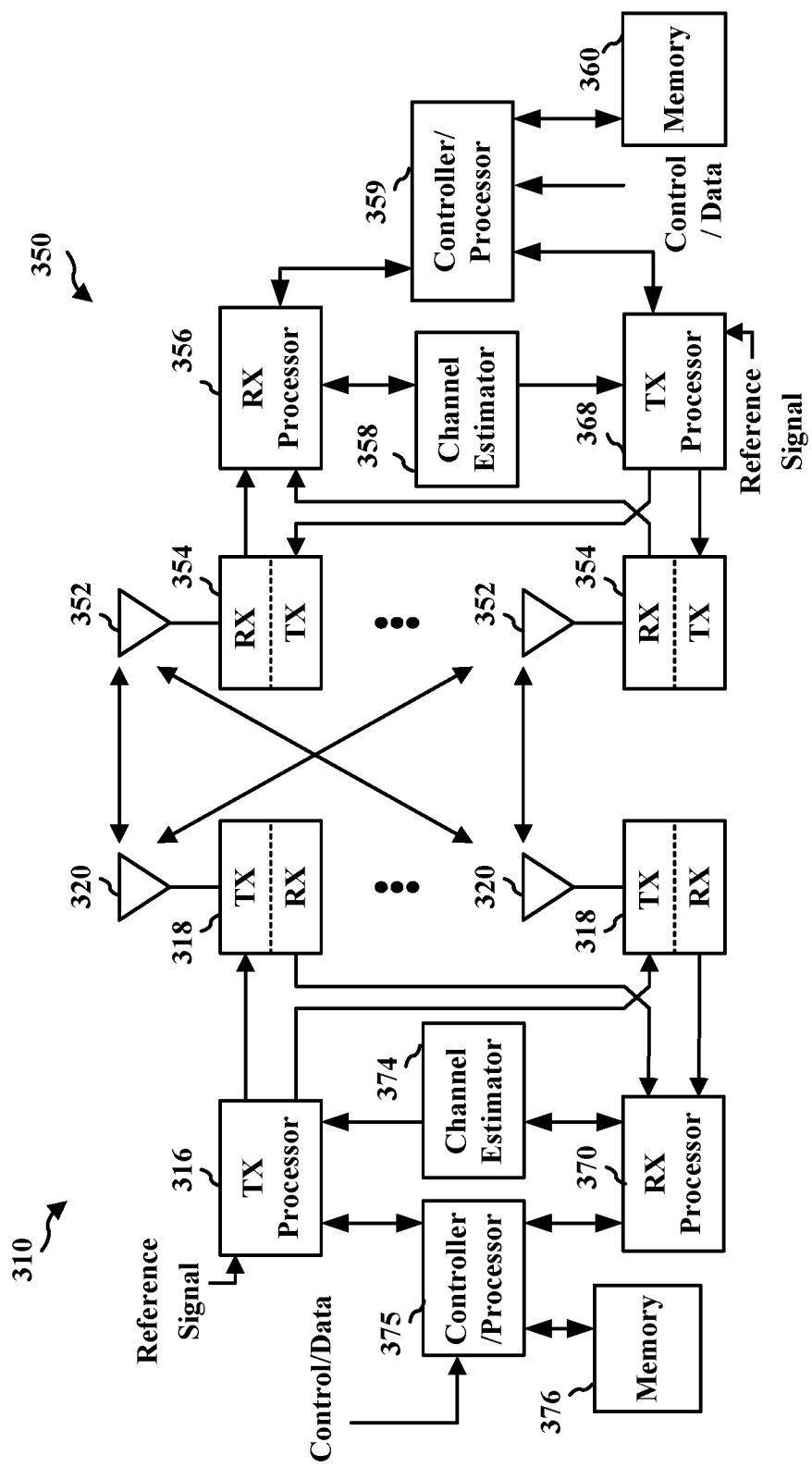
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

At least one of the TX processor 316, the RX processor 370, and the controller/processor 375 may be configured to perform aspects in connection with 191 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
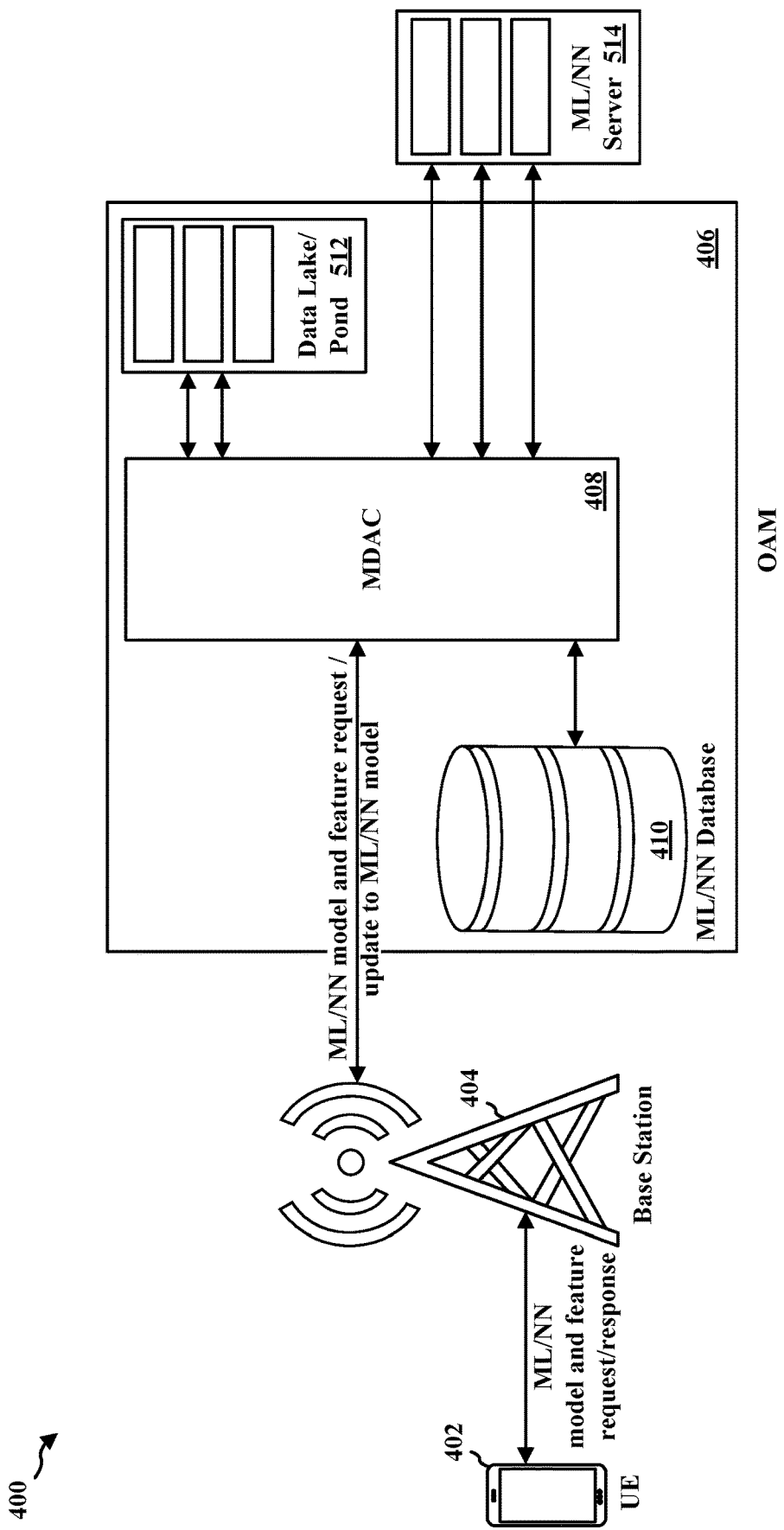
FIG. 4 illustrates a diagram of a network architecture for machine learning (ML) and neural network (NN) model discovery and management techniques.

FIG. 4 illustrates a diagram 400 of a network architecture for machine learning (ML) and neural network (NN) model discovery and management techniques. A performance of the ML/NN model may be based on a plurality of criteria, such as feature selection, model selection, a number of samples, etc. Feature selection may correspond to input parameters of the ML/NN model for training and testing the ML/NN model. Model selection may correspond to determining a model to be executed from a plurality of models (e.g., based a model complexity or optimization parameters). The number of samples may correspond to a number of observations for one or more features.

The selected models and features may have an impact on the performance of the ML/NN model and on a performance of the overall network architecture and system. A UE 402 and a base station 404 may perform procedures in the PHY layer, the MAC layer, and upper layers, where the ML/NN model may provide a performance enhancement. For different techniques in the PHY layer, MAC layer, etc., different ML/NN models may be utilized for different procedures of the UE 402 and the base station 404. For example, a first ML model may be utilized for a first procedure and a second ML model may be utilized for a second procedure based on one or more model selection techniques. If the UE 402 is associated with reduced power and/or computational complexity, either the UE 402 may be configured with a ML/NN model of low computational complexity, or the UE 402 may not be configured to perform ML/NN model and feature selection. Thus, the network (e.g., the base station 404 and an operation and management (OAM) core network 406) may assist the UE 402 with the ML/NN model and feature selection for different techniques of the PHY layer, the MAC layer, and the upper layers.

The OAM core network 406 may include a plurality of network entities and interfaces that allow for execution of the ML/NN procedures at the UE 402, the base station 404, and/or the OAM core network 406. The UE 402 may be configured to transmit a ML/NN model and feature request message to the base station 404, which may be further configured to transmit the model and feature request message to a model data access coordinator (MDAC) 408 of the OAM core network 406 for updating the ML/NN model. After the base station 404 receives an update to the ML/NN model based on the ML/NN model and feature request transmitted to the OAM core network 406, the base station 404 may transmit a ML/NN model and feature response message to the UE 402 based on the ML/NN model and feature request message received from the UE 402 and the update to the ML/NN model received from the OAM core network 406.

The MDAC 408 may communicate with a plurality of network entities, such as a ML/NN database 410, a data lake/pond 412, a ML/NN server 414, etc. In configurations, the ML/NN server 414 may be located within the OAM core network 406 (e.g., which may be an internet service provider (ISP) mobile edge computing (MEC) core network) or the ML/NN server 414 may be located outside of such networks and hosted by a different entity. An independent ML/NN leveler may be configured to level the ML/NN model within the ML/NN server 414. The UE 402 and the base station 404 may utilize ML/NN models that are registered at the ML/NN database 410, while the OAM core network 406 may execute authentication/verification protocols for generated the ML/NN models. The MDAC 408 may determine whether the authenticated/verified models are to be utilized or whether a different model is to be selected for a particular procedure.

The ML/NN database 410 may include ML/NN models for performing a plurality of operations, which may be based on updates to the ML/NN models. That is, the ML/NN database 410 may store different ML/NN models and updates. A granularity of storage of the ML/NN models may be per network slice, per cell, per RAT, per target area (TA), per RAN notification area (RNA), per PLMN, etc. The data lake/pond 412 may be used for storage of datasets and for performing principal component analysis (PCA) for different ML/NN procedures. For example, the data lake/pond 412 may store data for feature selection by the OAM core network 406 based on the request from the UE 402 and/or the base station 404. A granularity of feature selection storage of the ML/NN model may be per network slice, per cell, per RAT, per TA, per RNA, per PLMN, etc. The ML/NN server 414 may be configured to assist the UE 402, the RAN, or other ML/NN entities in model selection (e.g., outside the OAM core network 406). Model selection may be discoverable per network slice, per cell, per RAT, per TA, per RNA, per PLMN. The MDAC 408 may be configured as an interface that connects the ML/NN database 410, the data lake/pond 412, the ML/NN server 414, and the base station 404. For example, the MDAC 408 may be configured as a coordinating entity that provides interfaces between other network entities, provides the ML/NN models to the UE 402 and the base station 404, and performs authentication/verification of the ML/NN models.

The MDAC 408 may be a logical entity for data discovery and ML/NN model and analytics discovery. A protocol of the MDAC 408 may be associated with a domain name system (DNS), a relationship database, or a hypertext transfer protocol (HTTP), such as JavaScript object notation (JSON) or eXtensible markup language (XML). The discovery procedure may be based on sub-procedures for a ML training/inference host (e.g., UE 402, base station 404, or OAM core network 406) that transmits data and model requests to the MDAC 408 for coordination. The MDAC 408 may query the data lake/pond 412 and the ML/NN server 414 for a uniform resource identifier (URI) of the data and model. The MDAC 408 may signal the ML/NN database 410 for an update to the ML/NN model. The MDAC 408 may further request the data lake/pond 412 to initiate data collection, if the data for the procedure is not current or is unavailable, for signaling corresponding information to the base station 404 or the UE 402. In aspects, the MDAC 408 may request the ML/NN server 414 to generate a ML/NN model for a different ML/NN procedure, if a model is not available for such procedure. The MDAC 408 may update the ML/NN database 410 with an updated ML/NN model by pushing the updated ML/NN model to the ML/NN database 410. The MDAC 408 may transmit a response to the ML host with the URI of the requested data and ML model, and the ML host may fetch the data (e.g., via a HTTP Get URI (GETURI) command).

A search and discovery procedure for the ML/NN model may be based on any of one or more input parameters, one or more output parameters, a name, an identifier (ID), a keyword, or hypertext. However, the ML/NN model may have to first be registered with the ML/NN database 410. Thus, a non-registered ML/NN model that is not stored in the ML/NN database 410 may not be utilized. The UE 402, the base station 404, or the OAM core network 406 may be configured to initiate model procedures and the OAM core network 406 may be configured to generate or update a dataset of the ML/NN model for performing different ML/NN procedures (e.g., based on the PHY layer, the MAC layer, or upper layers).

Request and response information signaled for ML/NN model and feature selection may be associated with ML/NN procedures of different entities of the network architecture. For example, ML/NN model selection for inference and/or training may be network-initiated (e.g., initiated by the OAM core network 406 or the base station 404) or UE-initiated (e.g., initiated by the UE 402). Request and response information signaled for ML/NN model and feature selection may also be authenticated based on the ML/NN model.

Figures 5A, 5B:
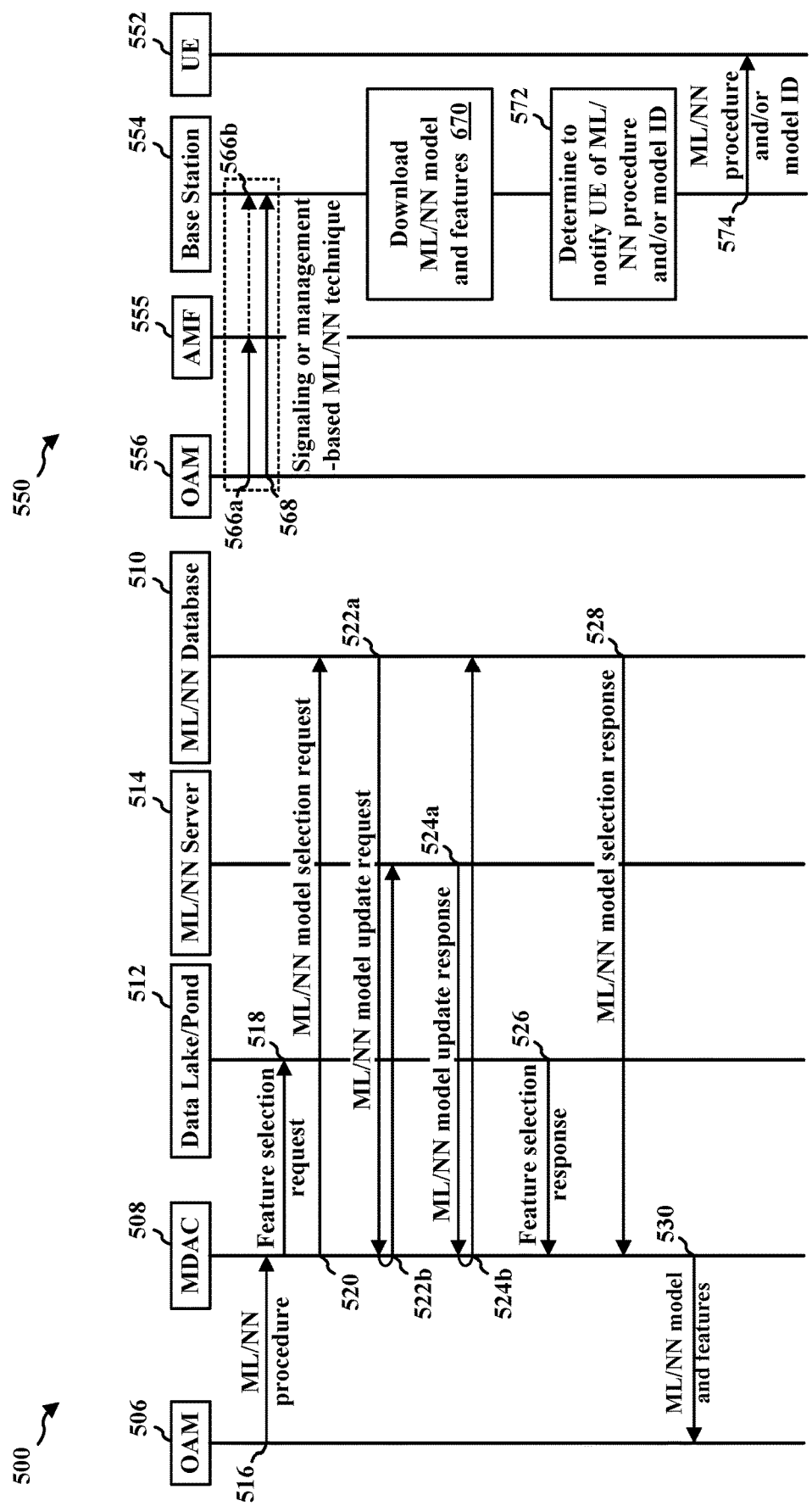
FIGS. 5A-5B illustrate call flow diagrams for ML/NN procedures based on signaling initiated by an operation and management (OAM) core network.

FIGS. 5A-5B illustrate call flow diagrams 500-550 for ML/NN procedures based on signaling initiated by an OAM core network 506/556. The OAM core network 506/556 may initiate ML/NN model selection for inference and/or training procedures. OAM-initiated ML/NN procedures may be signaling-based or management-based. Signaling-based procedures may correspond to an initiation of the ML/NN procedure in association with a particular UE 552, whereas OAM management-based procedures may correspond to an initiation of the ML/NN procedure in association with a particular TA. The OAM core network 506/556 may initiate the ML/NN procedure via the ML/NN model or a model ID in association with selected features. Upon receiving an indication of the OAM-initiated ML/NN procedure, the base station 554 may further indicate to the UE 552 the ML/NN model or model ID to be used for the ML/NN procedure. The ML/NN model may be transmitted to the UE 552 based on RRC signaling or the UE 552 may download the ML/NN model and features based on the HTTP GETURI request after receiving an indication of the model ID and features in a RRC message. That is, if base station 554 transmits the model directly to the UE 552, the transmitted model/features may be used by the UE 552. If the base station 554 transmits the model ID, the UE 552 may request and download the ML/NN model and features using the HTTP GETURI request. Accordingly, the base station 554 may either provide the model and features to the UE 552 or the base station 554 may indicate the model ID to the UE 552 for the UE 552 to independently download the model and features. If the UE 552 is handed-over to a second base station, the ML/NN model and features may be transferred/communicated to the second base station.

Referring to the call flow diagram 500, the OAM core network 506 may be configured to determine the ML/NN model and features to be transmitted to a UE or a base station for performing a corresponding ML/NN procedure. The OAM core network 506 may initiate, at 516, the ML/NN procedure via the MDAC 508 based on a model and feature selection request. For example, the MDAC 508 may receive, at 516, an indication of the ML/NN procedure and transmit, at 518, a feature selection request to the data lake/pond 512. Additionally or alternatively, the MDAC 508 may transmit, at 520, a ML/NN model selection request to the ML/NN database 510. If the ML/NN database 510 includes a threshold amount of data for the ML/NN model, the ML/NN database 510 may transmit, at 528, a ML/NN model selection response to the MDAC 508 indicative of the ML/NN model. Similarly, the data lake/pond 512 may transmit, at 526, a feature selection response to the MDAC 508 based on the feature selection request received, at 518.

If the ML/NN database 510 does not include the threshold amount of data for the ML/NN model, the ML/NN database 510 may transmit, at 522a, a ML/NN model update request to the MDAC 508, which may be further transmitted, at 522b, from the MDAC 508 to the ML/NN server 514. The ML/NN server 514 may transmit, at 524a, a ML/NN model update response indicative of the update to the ML/NN model to the MDAC 508, which may be further transmitted, at 524b, from the MDAC 508 to the ML/NN database 510. Based on the update to the ML/NN model, the ML/NN database 510 may transmit, at 528, a L/NN model selection response to the MDAC 508 based on the ML/NN model selection request received, at 520. The MDAC 508 may indicate, at 530, the ML/NN model and features to the OAM core network 506, which initiate operations of the call flow diagram 550 based on the indicated ML/NN model and features.

Referring to the call flow diagram 550, the OAM core network 556 may initiate, at 566a/568, a ML/NN procedure (e.g., via a signaling-based ML/NN technique or management-based ML/NN technique) for different network procedures (e.g., at the base station 554), UE procedures, or both. For signaled requests, the OAM core network 556 may select a UE 552 for the ML/NN procedure and indicate, at 566a, the request to an AMF 555. In aspects, the AMF 555 may relay the request, at 566b, to the base station 554, which may further relay the request (e.g., at 574) to the UE 552. For management requests, the OAM core network 556 may transmit, at 568, the request to a TA (e.g., that includes the base station 554). If the UE 552 is to perform the ML/NN procedure, the base station 554 may further transmit the request (e.g., at 574) to the UE 552. Some ML/NN procedures may correspond independently to the base station 554, independently to the UE 552, or to both the base station 554 and the UE 552.

Based on the signaling-based request or the management-based request received, at 566b/568, from the OAM core network 556, the base station 554 may download, at 570, the ML/NN model and features from the OAM core network 556. At 572, the base station 554 may determine to notify the UE 552 of ML/NN procedure and/or a corresponding model ID. At 574, the base station 554 may transmit the ML/NN model and features to the UE 552 for performing the ML/NN procedure or the base station 554 may transmit the ML/NN model ID to the UE 552 for the UE 552 to independently download the ML/NN model.

Figure 6:
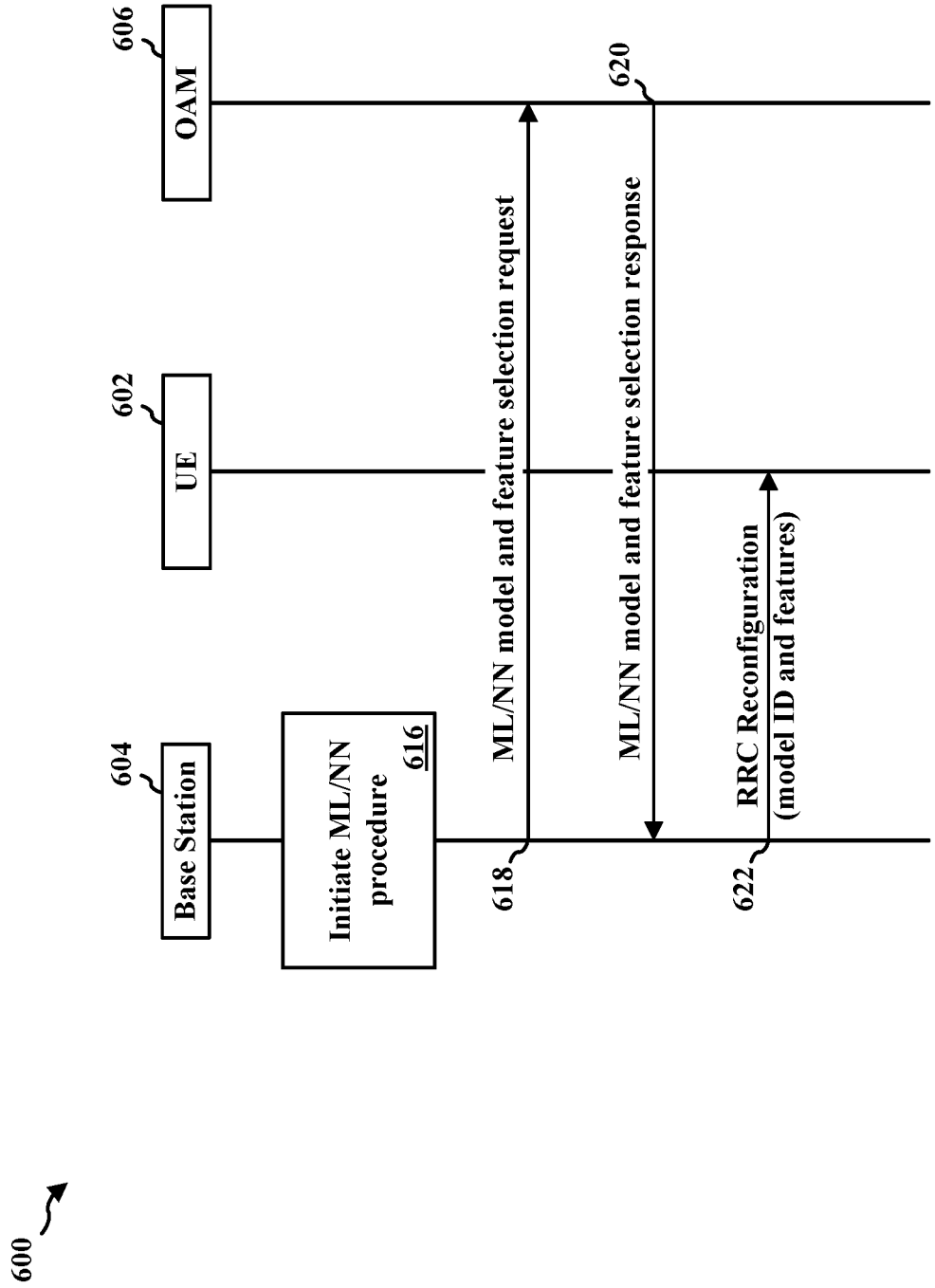
FIG. 6 illustrates a call flow diagram for a ML/NN procedure based on base station-initiated signaling.

FIG. 6 illustrates a call flow diagram 600 for a ML/NN procedure based on base station-initiated signaling. The base station 604 may be configured to initiate ML/NN model selection techniques for inference and/or training procedures. In aspects, the base station 604 may initiate, at 616, the ML/NN procedure based on an initialization or based on performance degrading below a threshold. For example, if the ML/NN procedure is for encoding/decoding data transmitted between the base station 604 and the UE 602, the base station 604 may determine to initiate, at 616, the ML/NN model selection technique to increase the performance. The base station 604 may also switch the ML/NN procedure based on switching to different models and features for performing the ML/NN procedure.

The base station 604 may transmit, at 618, a ML/NN model and feature selection request to the OAM core network 606. Upon receiving, at 620, a ML/NN model and feature selection response from the OAM core network 606 to the ML/NN model and feature selection request, the base station 604 may transmit a RRC message to the UE 602 for initiating the ML/NN procedure. The RRC message may be a RRCReconfiguration message, a RRCSetup message, a RRCResume message, a RRCReestablishment message, etc., which may indicate a model ID, a ML/NN procedure ID, and/or a feature metric to the UE 602. The UE may utilize the information included in the RRC message, such as the model ID, a feature list, etc., for performing the ML/NN procedure.

In configurations, the base station 604 may instruct the UE 602 to execute the ML/NN model for procedures such as cell-reselection, logged measurements, early measurements, and other idle or inactive mode procedures. Separate from connected mode procedures, the base station 604 may download the ML/NN model and signal a configuration to the UE 602 (e.g., based on a RRCReconfiguration message) for performing the idle or inactive mode procedures. The base station 604 may provide the ML/NN model or the model ID and features to the UE 602 in a RRCRelease message.

The UE 602 may be configured to determine whether to perform the ML/NN inference and/or training procedures based on conditions of the UE 602. For example, the UE 602 may be configured to accept the ML/NN model, reject the ML/NN model, or propose an alternative ML/NN model. The UE 602 may transmit a request for ML/NN inference reductions based on the conditions of the UE 602, such as overheating, limited processing (e.g., microprocessor without interlocked pipelined stages (MIPS), instructions per second limitations), battery state, amongst others. In order to send the message/request, the UE 602 may utilize UE-assistance information or an RRC message for suspending ML/NN inference and training and/or reducing ML/NN complexity. In response, the network (e.g., the base station 604 and/or OAM core network 606) may signal alternative models as a fallback (e.g., if the UE 602 transmits a request for reduce complexity) or the network may signal complexity reduction parameters that the UE 602 may use to reduce the ML/NN complexity. If the UE 602 is operating based on an increased number of features, the network may signal the UE 602 to stop executing a subset of the features (e.g., features 1 to k), but to execute a remaining subset of the features for providing reduced ML/NN complexity.

Additionally or alternatively, for an ML/NN inference and/or training procedure, the network may request a plurality of models and associated features. Thus, instead of transmitting the request and receiving the response for each ML/NN inference and training procedure, the network may provide multiple ML/NN models and feature selections to the UE 602 at a same time. The UE 602 may be configured to alternate between high performance and model reduction based on CPU metrics, power consumption, power status, etc., of the UE 602.

Figure 7:
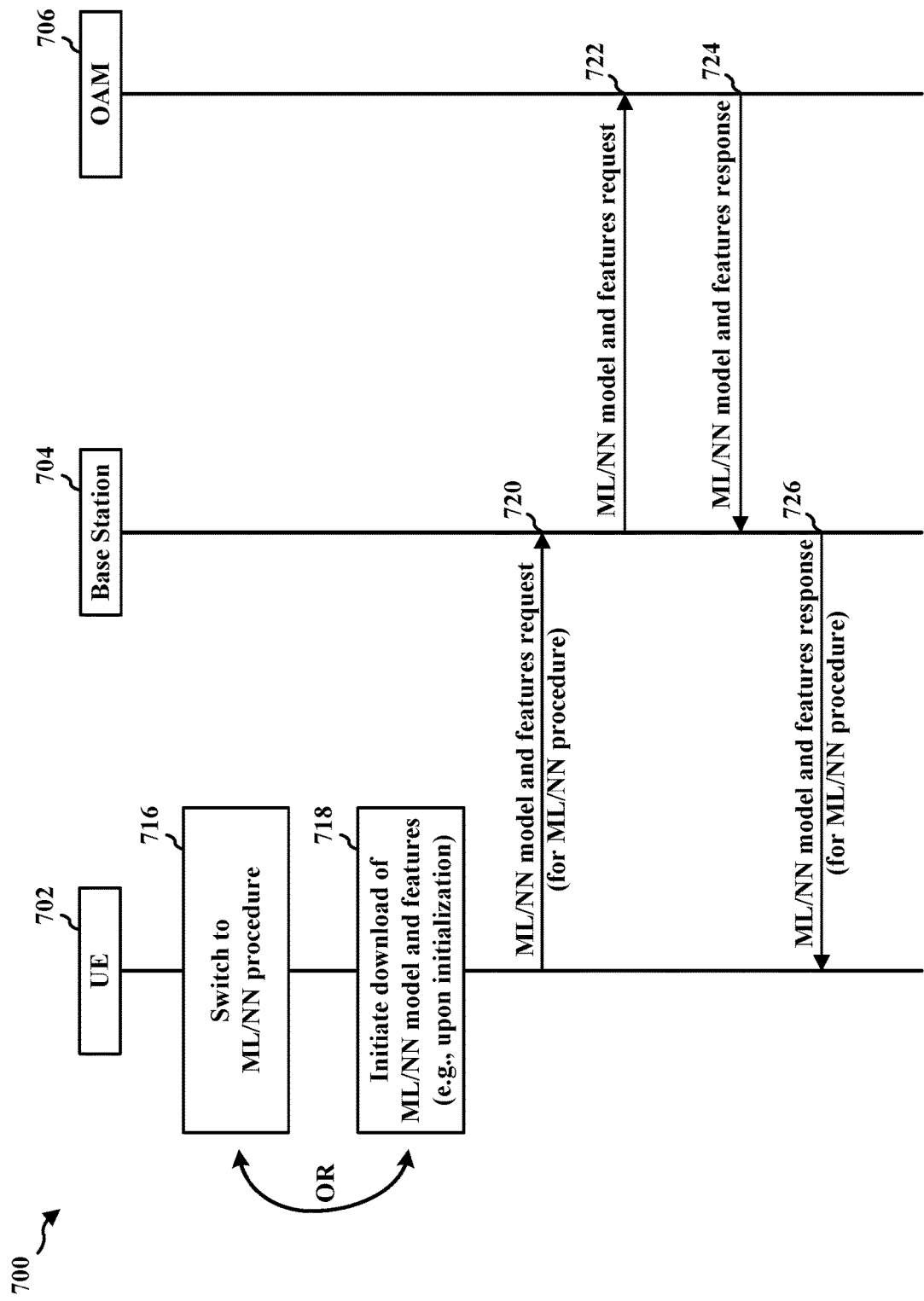
FIG. 7 illustrates a call flow diagram for UE-initiated model and features signaling.

FIG. 7 illustrates a call flow diagram 700 for UE-initiated model and feature signaling. The UE 702 may determine to switch, at 716, the ML/NN model to a particular ML/NN procedure. Alternatively, upon initialization of a ML/NN procedure, the UE 702 may initiate, at 718, a procedure for downloading the ML/NN model and features. For example, if the performance of the UE 702 degrades below a threshold, the UE 702 may transmit, at 720, a ML/NN model and feature request to the base station 704 to switch to the ML/NN procedure of the UE 702 and increase the performance of the UE 702, such as for ML/NN procedures associated with encoding and decoding operations. The ML/NN model and feature request may be further transmitted, at 722, from the base station 704 to the OAM core network 706, which may transmit, at 724, a ML/NN model and feature response to the base station 704 based on the received ML/NN model and feature request. The base station 704 may likewise relay, at 726, the ML/NN model and feature response for the ML/NN procedure to the UE 702 based on the ML/NN model and feature request received, at 720, and the ML/NN model and feature response received, at 724.

In aspects, the UE 702 may provide a UEAssistanceInformation message or other dedicated RRC signaling for the initialization/switch request for the ML/NN model and feature selection. Upon initiation of the ML/NN procedure, the UE 702 may determine to download the associated ML/NN model or transmit a request to the serving base station 704. For example, upon activation of the network (e.g., RAN slice), the UE 702 may determine to use a ML/NN model, which may be requested from the base station 704. The UE 702 may utilize the UEAssistanceInformation message or other dedicated RRC signaling for requesting the ML/NN model.

Authentication techniques may be performed prior to using the ML/NN model. For example, use of the ML/NN model by the UE 702 may depend on a threshold level of security for the ML/NN model. Thus, the ML/NN model and features may be first verified by the network. Different security aspects may be associated with downloading the ML/NN model. For trusted models, each ML/NN model may be stored based on a signature (e.g., similar to a SSL certificate) issued by a trusted entity. The UE 702 may verify the signature/certificate before using the ML/NN model. For trusted users, each ML/NN model may include an authorized user list. A privilege of each user may be verified via the downloading request.

Figure 8:
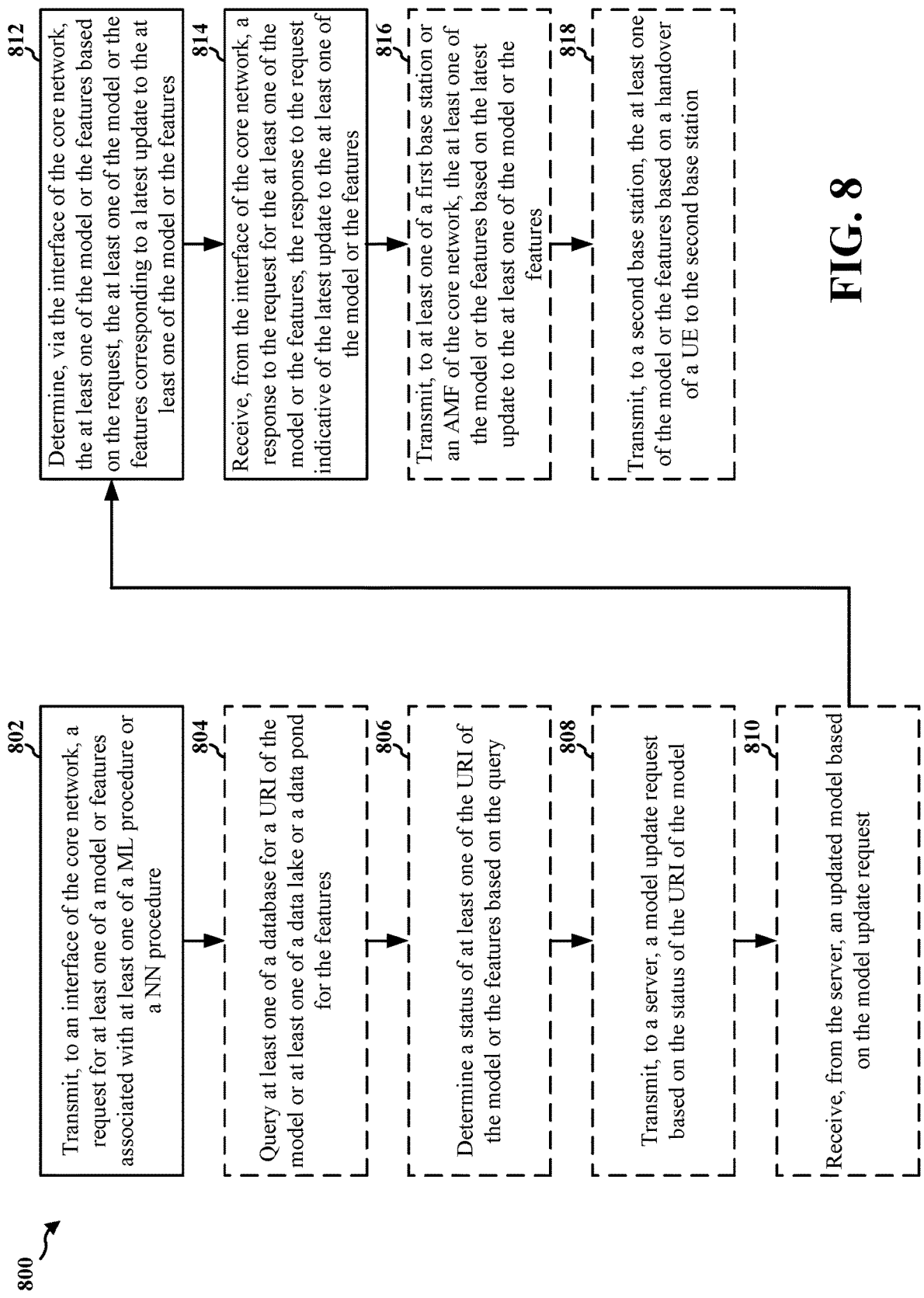
FIG. 8 is a flowchart of a method of wireless communication of an OAM core network.

FIG. 8 is a flowchart 800 of a method of wireless communication. The method may be performed by a core network (e.g., the core network 190; the OAM core network 406, 506, 556, 606, 706; the apparatus 1102; etc.), which may include the memory 376 and which may be the entire core network 190, 406, 506, 556, 606, 706 or a component of the core network 190, 406, 506, 556, 606, 706, such as the TX processor 316, the RX processor 370, and/or the controller/processor 375.

At 802, the core network may transmit, to an interface of the core network, a request for at least one of a model or features associated with at least one of a ML procedure or a NN procedure. For example, referring to FIGS. 4-5A, the core network 506 may indicate, at 516, the ML/NN procedure to the MDAC 508. The interface of the core network may be the MDAC 408/508 that interfaces with at least one of a database 410/510, a data lake 412/512, a data pond 412/512, a server 414/514, or a base station 404. The transmission of the request (e.g., at 516) for the at least one of the model or the features may be initiated based on an indication from at least one of the core network 406/506, a base station 404/604, or a UE 402/702. In aspects, the core network (e.g., core network 190) may correspond to an OAM entity (e.g., 406, 506, 556, 606, 706).

At 804, the core network may query at least one of a database for a URI of the model or at least one of a data lake or a data pond for the features. For example, referring to FIG. 5A, the MDAC 508 of the OAM core network 506 may transmit, at 520, a ML/NN model selection request to the ML/NN database 510 and transmit, at 518, a feature selection request to the data lake/pond 512.

At 806, the core network may determine a status of at least one of the URI of the model or the features based on the query. For example, referring to FIG. 5A, the MDAC 508 of the OAM core network 506 may determine a status of the ML/NN model based on the ML/NN model selection response received, at 528, from the ML/NN database 510 and/or a status of the features based on the feature selection response received, at 526, from the data lake/pond 512.

At 808, the core network may transmit, to a server, a model update request based on the status of the URI of the model. For example, referring to FIG. 5A, the MDAC 508 of the OAM core network 506 may transmit, at 522*b*, a ML/NN model update request to the ML/NN server 514 based on an indication received, at 522*a*, from the ML/NN database 510.

At 810, the core network may receive, from the server, an updated model based on the model update request. For example, referring to FIG. 5A, the MDAC 508 of the OAM core network 506 may receive, at 524*a*, a ML/NN model update response from the ML/NN server 514 based on the ML/NN model update request transmitted, at 522*b*, to the ML/NN server 514. The updated model may be registered in the ML/NN database 510 based on an authentication procedure for the updated model.

At 812, the core network may determine, via the interface of the core network, the at least one of the model or the features based on the request, the at least one of the model or the features corresponding to a latest update to the at least one of the model or the features. For example, referring to FIG. 5A, the MDAC 508 of the OAM core network 506 may determine the ML/NN model based on the ML/NN model selection response received, at 528, from the ML/NN database 510. In aspects, the ML/NN model selection response may be based on the ML/NN model update response transmitted, at 524*a*, from the ML/NN server 514. The MDAC 508 of the core network 506 may additionally or alternatively determine the features based on the feature selection response received, at 526, from the data lake/pond 512, which may be based on updated data.

At 814, the core network may receive, from the interface of the core network, a response to the request for the at least one of the model or the features, the response to the request indicative of the latest update to the at least one of the model or the features. For example, referring to FIG. 5A, the core network 506 may receive, at 530, a ML/NN model and features from the MDAC 508. The ML/NN model and features received, at 530, may be indicative of the ML/NN model selection response transmitted, at 528, from the ML/NN database 510 and/or the feature selection response transmitted, at 526, from the data lake/pond 512.

At 816, the core network may transmit, to at least one of a first base station or an AMF of the core network, the at least one of the model or the features based on the latest update to the at least one of the model or the features. For example, referring to FIGS. 5A-5B, the OAM 506/556 may transmit, at 566a, the ML/NN model and features to the AMF via a signaling-based ML/NN technique or transmit, at 568, the ML/NN model and features to the base station 554 via a management-based ML/NN techniques. In aspects, the transmissions, at 566a/568, may be based on the ML/NN model and features received, at 530. The transmission, at 568, to the at least one of the first base station (e.g., 554) or the AMF 555 of the core network (e.g., OAM core network 556) may be configured to initiate the at least one of the ML procedure or the NN procedure, the at least one of the ML procedure or the NN procedure being at least one of a signaling procedure or a management procedure.

At 818, the core network may transmit, to a second base station, the at least one of the model or the features based on a handover of a UE to the second base station. For example, referring to FIG. 1, the core network 190 may transmit the ML/NN model and features to a second base station (e.g., 102) based on a handover of the UE 104 from a first base station (e.g., 180) to the second base station (e.g., 102).

Figure 9:
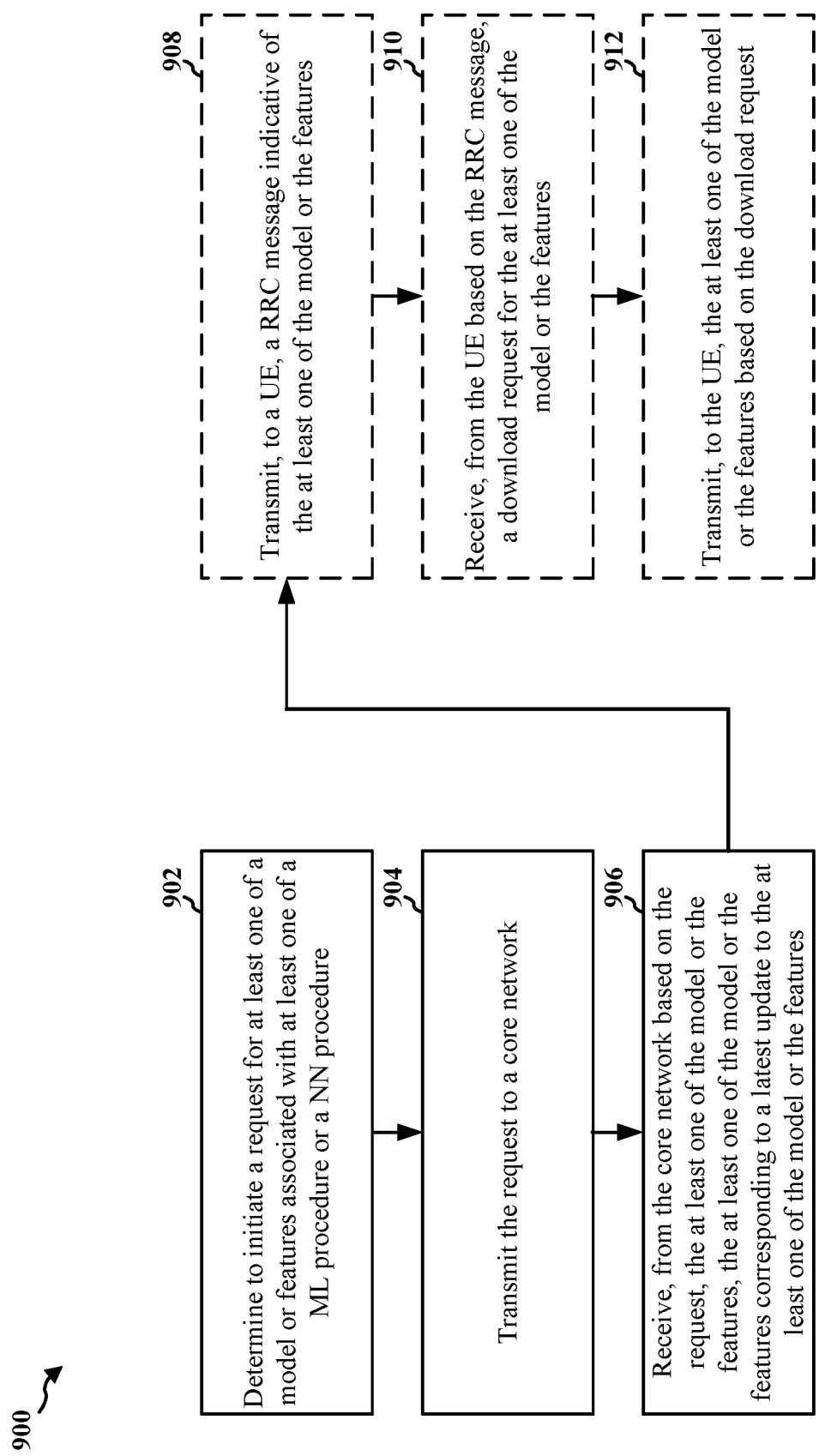
FIG. 9 is a flowchart of a method of wireless communication of a base station.

FIG. 9 is a flowchart 900 of a method of wireless communication. The method may be performed by a base station (e.g., the base station 102, 180, 404, 554, 604, 704; the apparatus 1202; etc.), which may include the memory 376 and which may be the entire base station 102, 180, 404, 554, 604, 704 or a component of the base station 102, 180, 404, 554, 604, 704, such as the TX processor 316, the RX processor 370, and/or the controller/processor 375.

At 902, the base station may determine to initiate a request for at least one of a model or features associated with at least one of a ML procedure or a NN procedure. For example, referring to FIG. 6, the base station 604 may determine to initiate, at 616, an ML/NN procedure. The determination to initiate the request, at 616, may be based on at least one of an initialization of the ML procedure, an initialization of the NN procedure, or a degradation in performance of the base station 604.

At 904, the base station may transmit the request to a core network. For example, referring to FIG. 6, the base station 604 may transmit, at 618, a ML/NN model and feature selection request to the OAM core network 606.

At 906, the base station may receive, from the core network based on the request, the at least one of the model or the features, the at least one of the model or the features corresponding to a latest update to the at least one of the model or the features. For example, referring to FIG. 6, the base station 604 may receive, at 620, a ML/NN model and feature selection response from the OAM core network 606 based on the ML/NN model and feature selection request transmitted, at 618.

At 908, the base station may transmit, to a UE, a RRC message indicative of the at least one of the model or the features. For example, referring to FIG. 6, the base station 604 may transmit, at 622, a RRC reconfiguration message to the UE 602 indicative of a model ID and features. In aspects, the RRC message may correspond to at least one of a RRC setup message, a RRC resume message, or a RRC reestablishment message associated with at least one of a ID, a procedure ID, or a features metric. In further aspects, the RRC message may correspond to a RRC release message associated with at least one of a cell reselection procedure, a recorded measurement, a predicted measurement, or an idle mode procedure.

At 910, the base station may receive, from the UE based on the RRC message, a download request for the at least one of the model or the features. For example, referring to FIG. 7, the base station 704 may receive, at 720, a ML/NN model and features request from the UE 702 based on a download of the ML/NN model and features initiated, at 718, by the UE 702.

At 912, the base station may transmit, to the UE, the at least one of the model or the features based on the download request. For example, referring to FIG. 7, the base station 704 may transmit, at 726, a ML/NN model and features response to the UE 702 based on the ML/NN model and features request received, at 720, from the UE 702.

Figure 10:
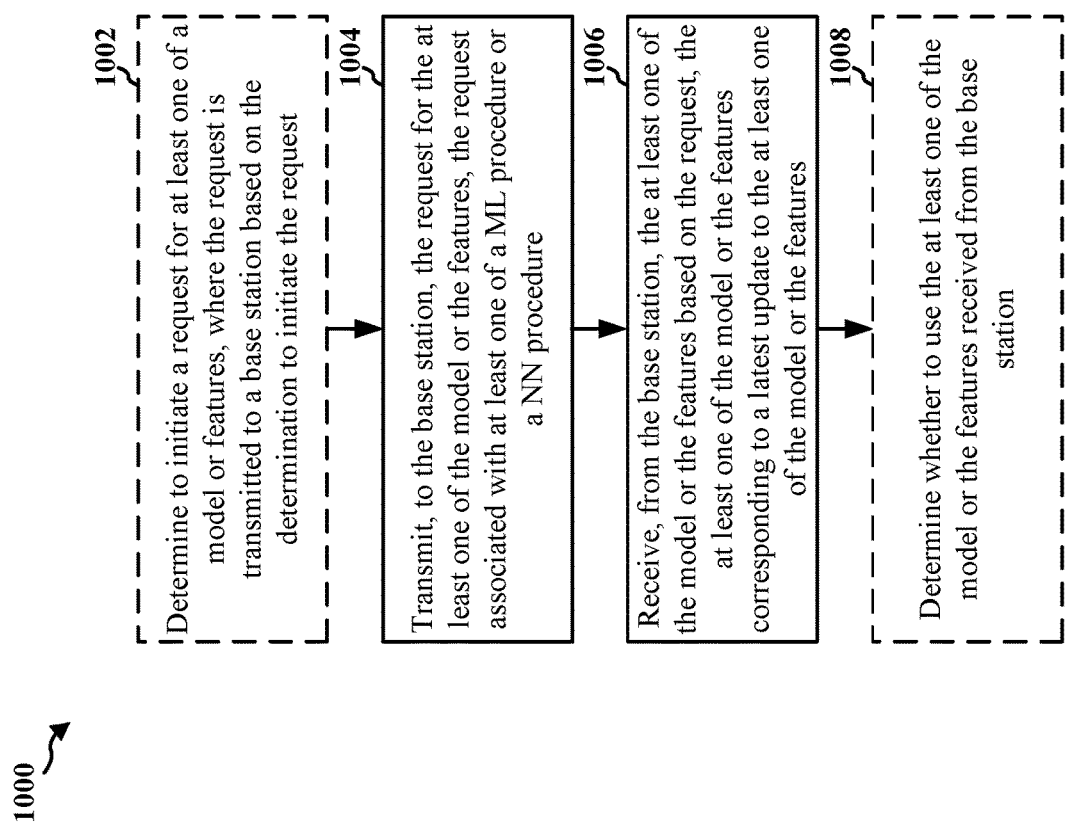
FIG. 10 is a flowchart of a method of wireless communication of a UE.

FIG. 10 is a flowchart 1000 of a method of wireless communication. The method may be performed by a UE (e.g., the UE 104, 402, 552, 602, 702; the apparatus 1302; etc.), which may include the memory 360 and which may be the entire UE 104, 402, 552, 602, 702 or a component of the UE 104, 402, 552, 602, 702, such as the TX processor 368, the RX processor 356, and/or the controller/processor 359.

At 1002, the UE may determine to initiate a request for at least one of a model or features, where the request is transmitted to a base station based on the determination to initiate the request. For example, referring to FIG. 7, the UE 702 may determine to initiate a ML/NN model and features request to a base station 704. The determination to initiate the request transmitted, at 720, may be based on switching, at 716, from the at least one of the ML procedure or the NN procedure to at least one of a second ML procedure or a second NN procedure. Additionally or alternatively, the determination to initiate the request transmitted, at 720, may be based on an initialization of the at least one of the ML procedure or the NN procedure. The determination to initiate the request transmitted, at 720, may also be based on a performance degradation of the UE 702.

At 1004, the UE may transmit, to the base station, the request for the at least one of the model or the features, the request associated with at least one of a ML procedure or a NN procedure. For example, referring to FIG. 7, the UE 702 may transmit, at 720, the ML/NN model and features request to the base station 704 for the ML/NN procedure.

At 1006, the UE may receive, from the base station, the at least one of the model or the features based on the request, the at least one of the model or the features corresponding to a latest update to the at least one of the model or the features. For example, referring to FIG. 7, the UE 702 may receive, at 726, the ML/NN model and features response from the base station 704 for the ML/NN procedure, which may be based on an update to the ML/NN model and features via a request and response to/from the OAM core network 706 (e.g., received and transmitted at 722 and 724).

At 1008, the UE may determine whether to use the at least one of the model or the features received from the base station. For example, referring to FIG. 7, the UE 702 may determine whether to use the ML/NN model and features for the ML/NN procedure indicated via the ML/NN model and features response received, at 726, from the base station 704. For instance, the UE 702 may determine to use a different ML/NN model and features than the ML/NN model and features indicated via the ML/NN model and features response from the base station 704.

Figure 11:
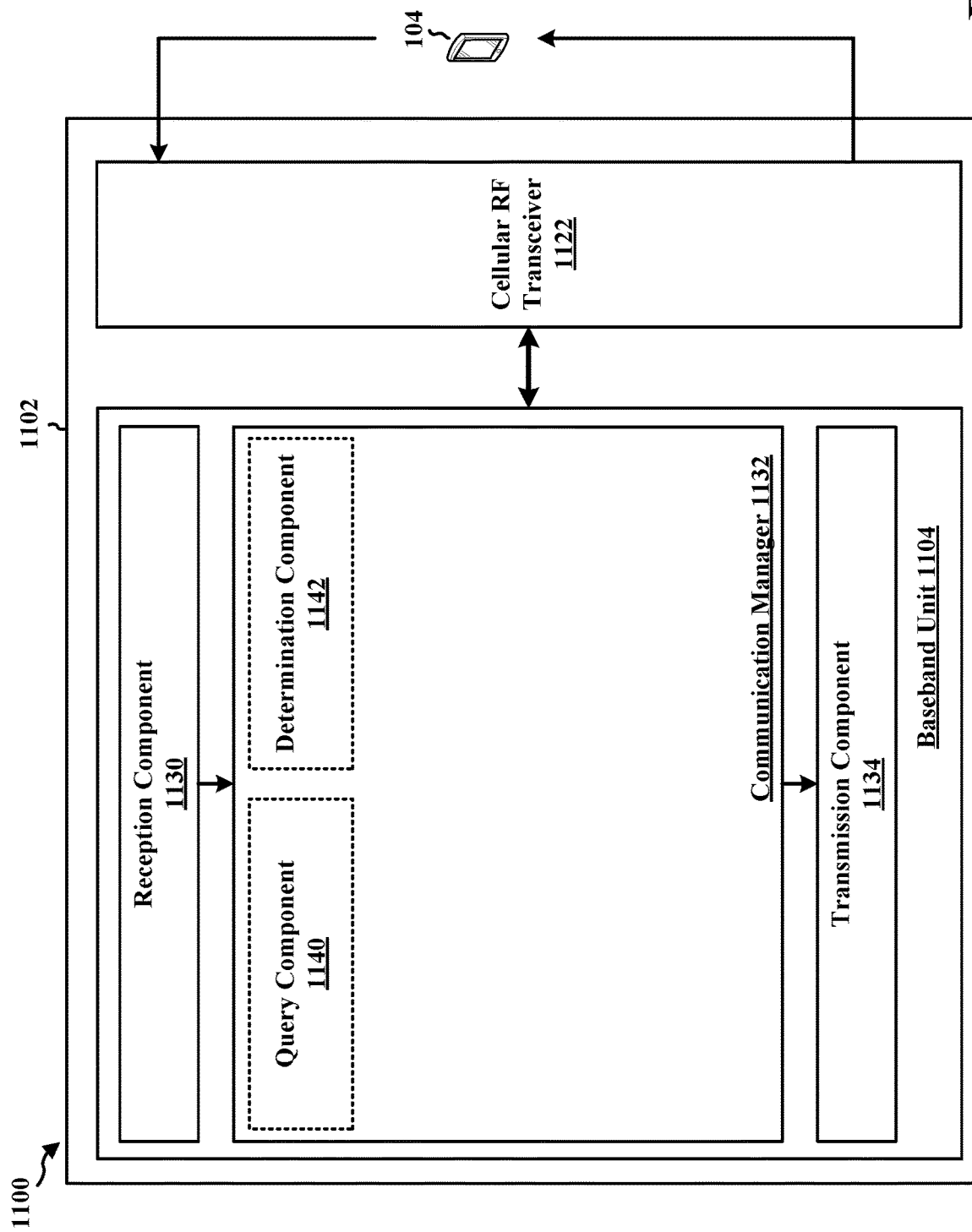
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The reception component 1130 is configured, e.g., as described in connection with 810 and 814, to receive, from the server, an updated model based on the model update request; and to receive, from the interface of the core network, a response to the request for the at least one of the model or the features, the response to the request indicative of the latest update to the at least one of the model or the features. The communication manager 1132 includes a query component 1140 that is configured, e.g., as described in connection with 804, to query at least one of a database for a URI of the model or at least one of a data lake or a data pond for the features. The communication manager 1132 further includes a determination component 1142 that is configured, e.g., as described in connection with 806 and 812, to determine a status of at least one of the URI of the model or the features based on the query; and to determine, via the interface of the core network, the at least one of the model or the features based on the request, the at least one of the model or the features corresponding to a latest update to the at least one of the model or the features. The transmission component 1134 is configured, e.g., as described in connection with 802, 808, 816, and 818, to transmit, to an interface of the core network, a request for at least one of a model or features associated with at least one of a ML procedure or a NN procedure; to transmit, to a server, a model update request based on the status of the URI of the model; to transmit, to at least one of a first base station or an AMF of the core network, the at least one of the model or the features based on the latest update to the at least one of the model or the features; and to transmit, to a second base station, the at least one of the model or the features based on a handover of a UE to the second base station.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for transmitting, to an interface of the core network, a request for at least one of a model or features associated with at least one of a ML procedure or a NN procedure; means for determining, via the interface of the core network, the at least one of the model or the features based on the request, the at least one of the model or the features corresponding to a latest update to the at least one of the model or the features; and means for receiving, from the interface of the core network, a response to the request for the at least one of the model or the features, the response to the request indicative of the latest update to the at least one of the model or the features. The apparatus 1102 further includes means for querying at least one of the database for a URI of the model or at least one of the data lake or the data pond for the features; and means for determining a status of at least one of the URI of the model or the features based on the query. The apparatus 1102 further includes means for transmitting, to the server, a model update request based on the status of the URI of the model; and means for receiving, from the server, an updated model based on the model update request. The apparatus 1102 further includes means for transmitting, to at least one of a first base station or an AMF of the core network, the at least one of the model or the features based on the latest update to the at least one of the model or the features. The apparatus 1102 further includes means for transmitting, to a second base station, the at least one of the model or the features based on a handover of a UE to the second base station. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
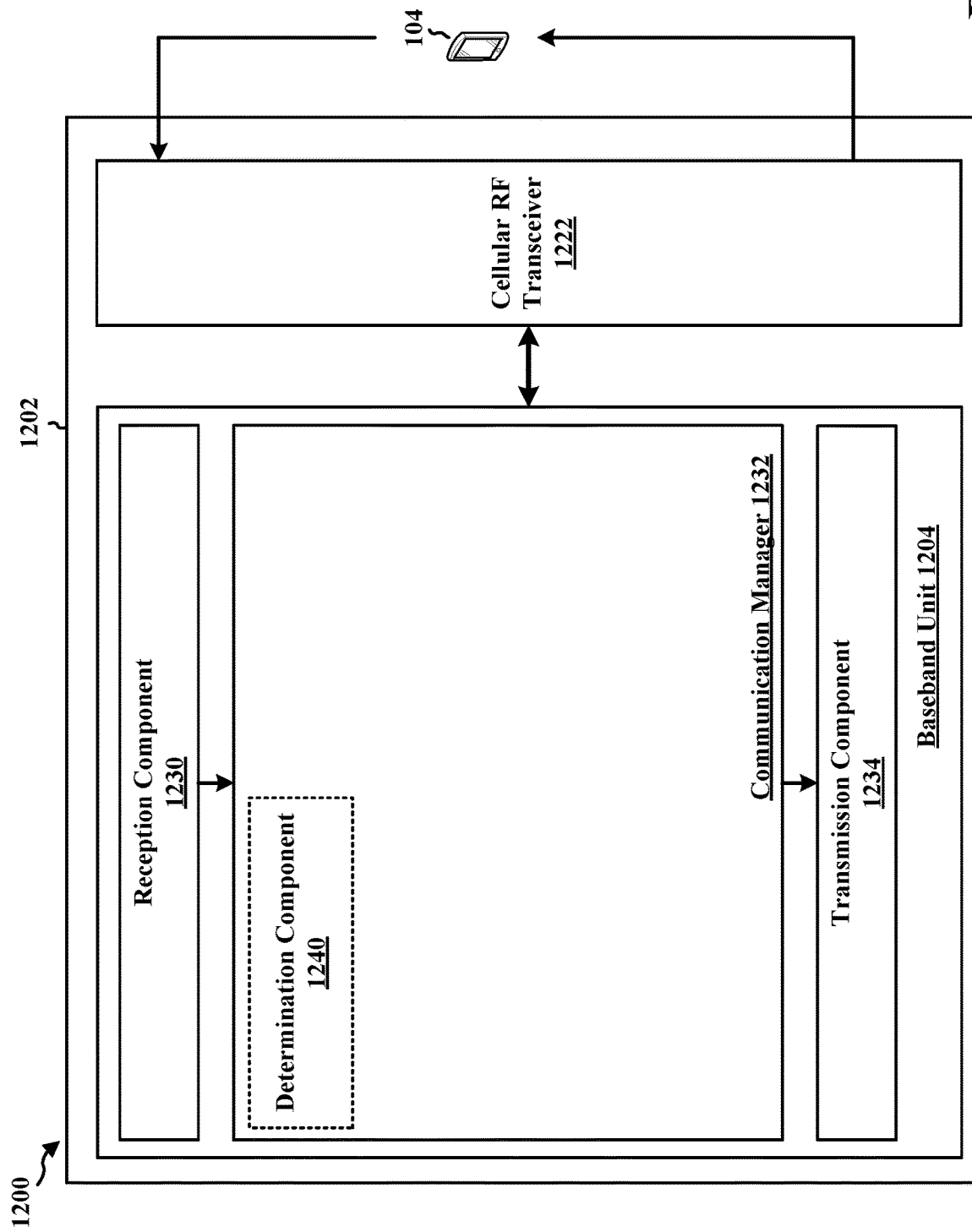
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The reception component 1230 is configured, e.g., as described in connection with 906 and 910, to receive, from the core network based on the request, the at least one of the model or the features, the at least one of the model or the features corresponding to a latest update to the at least one of the model or the features; and to receive, from the UE based on the RRC message, a download request for the at least one of the model or the features. The communication manager 1232 includes a determination component 1240 that is configured, e.g., as described in connection with 902, to determine to initiate a request for at least one of a model or features associated with at least one of a ML procedure or a NN procedure. The transmission component 1234 is configured, e.g., as described in connection with 904, 908, and 912, to transmit the request to a core network; to transmit, to a UE, a RRC message indicative of the at least one of the model or the features; and to transmit, to the UE, the at least one of the model or the features based on the download request.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for determining to initiate a request for at least one of a model or features associated with at least one of a ML procedure or a NN procedure; means for transmitting the request to a core network; and means for receiving, from the core network based on the request, the at least one of the model or the features, the at least one of the model or the features corresponding to a latest update to the at least one of the model or the features. The apparatus 1202 further includes means for transmitting, to a UE, a RRC message indicative of the at least one of the model or the features. The apparatus 1202 further includes means for receiving, from the UE based on the RRC message, a download request for the at least one of the model or the features; and means for transmitting, to the UE, the at least one of the model or the features based on the download request. The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
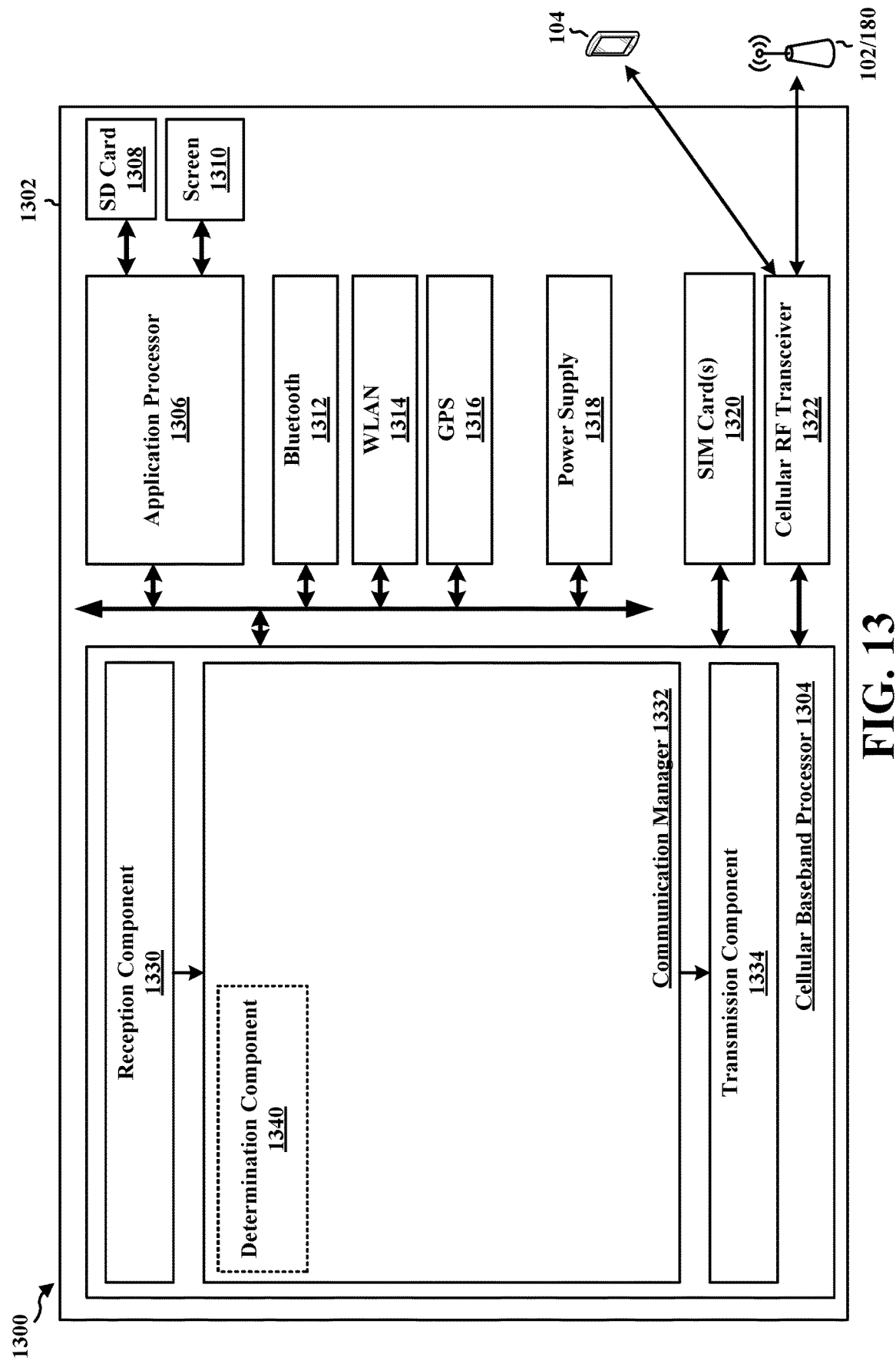
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The reception component 1330 is configured, e.g., as described in connection with 1006, to receive, from the base station, the at least one of the model or the features based on the request, the at least one of the model or the features corresponding to a latest update to the at least one of the model or the features. The communication manager 1332 includes a determination component 1340 that is configured, e.g., as described in connection with 1002 and 1008, to determine to initiate a request for at least one of a model or features, where the request is transmitted to a base station based on the determination to initiate the request; and to determine whether to use the at least one of the model or the features received from the base station. The transmission component 1334 is configured, e.g., as described in connection with 1004, to transmit, to the base station, the request for the at least one of the model or the features, the request associated with at least one of a ML procedure or a NN procedure.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for transmitting, to a base station, a request for at least one of a model or features associated with at least one of a ML procedure or a NN procedure; and means for receiving, from the base station, the at least one of the model or the features based on the request, the at least one of the model or the features corresponding to a latest update to the at least one of the model or the features. The apparatus 1302 further includes means for determining to initiate the request for the at least one of the model or the features, where the request is transmitted to the base station based on the determination to initiate the request. The apparatus 1302 further includes means for determining whether to use the at least one of the model or the features received from the base station. The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a core network, characterized by: transmitting, to an interface of the core network, a request for at least one of a model or features associated with at least one of a ML procedure or a NN procedure; determining, via the interface of the core network, the at least one of the model or the features based on the request, the at least one of the model or the features corresponding to a latest update to the at least one of the model or the features; and receiving, from the interface of the core network, a response to the request for the at least one of the model or the features, the response to the request indicative of the latest update to the at least one of the model or the features.

Aspect 2 may be combined with aspect 1 and is characterized in that the interface of the core network is a MDAC that interfaces with at least one of a database, a data lake, a data pond, a server, or a base station.

Aspect 3 may be combined with any of aspects 1-2 and is further characterized by querying at least one of the database for a URI of the model or at least one of the data lake or the data pond for the features; and determining a status of at least one of the URI of the model or the features based on the query.

Aspect 4 may be combined with any of aspects 1-3 and is further characterized by transmitting, to the server, a model update request based on the status of the URI of the model; and receiving, from the server, an updated model based on the model update request.

Aspect 5 may be combined with any of aspects 1-4 and is characterized in that the updated model is registered in the database based on an authentication procedure for the updated model.

Aspect 6 may be combined with any of aspects 1-5 and is further characterized by transmitting, to at least one of a first base station or an AMF of the core network, the at least one of the model or the features based on the latest update to the at least one of the model or the features.

Aspect 7 may be combined with any of aspects 1-6 and is characterized in that the transmission to the at least one of the first base station or the AMF of the core network is configured to initiate the at least one of the ML procedure or the NN procedure, the at least one of the ML procedure or the NN procedure being at least one of a signaling procedure or a management procedure.

Aspect 8 may be combined with any of aspects 1-7 and is further characterized by transmitting, to a second base station, the at least one of the model or the features based on a handover of a UE to the second base station.

Aspect 9 may be combined with any of aspects 1-8 and is characterized in that the transmission of the request for the at least one of the model or the features is initiated based on an indication from at least one of the core network, a base station, or a UE.

Aspect 10 may be combined with any of aspects 1-9 and is characterized in that the core network corresponds to an OAM entity.

Aspect 11 is a method of wireless communication of a base station, characterized by: determining to initiate a request for at least one of a model or features associated with at least one of a ML procedure or a NN procedure; transmitting the request to a core network; and receiving, from the core network based on the request, the at least one of the model or the features, the at least one of the model or the features corresponding to a latest update to the at least one of the model or the features.

Aspect 12 may be combined with aspect 11 and is characterized in that the determination to initiate the request is based on at least one of an initialization of the ML procedure, an initialization of the NN procedure, or a degradation in performance of the base station.

Aspect 13 may be combined with any of aspects 11-12 and is further characterized by transmitting, to a UE, a RRC message indicative of the at least one of the model or the features.

Aspect 14 may be combined with any of aspects 11-13 and is further characterized by receiving, from the UE based on the RRC message, a download request for the at least one of the model or the features; and transmitting, to the UE, the at least one of the model or the features based on the download request.

Aspect 15 may be combined with any of aspects 11-14 and is characterized in that the RRC message corresponds to at least one of a RRC setup message, a RRC resume message, or a RRC reestablishment message associated with at least one of a model ID, a procedure ID, or a features metric.

Aspect 16 may be combined with any of aspects 11-15 and is characterized in that the RRC message corresponds to a RRC release message associated with at least one of a cell reselection procedure, a recorded measurement, a predicted measurement, or an idle mode procedure.

Aspect 17 is a method of wireless communication of a UE, characterized by: transmitting, to a base station, a request for at least one of a model or features associated with at least one of a ML procedure or a NN procedure; and receiving, from the base station, the at least one of the model or the features based on the request, the at least one of the model or the features corresponding to a latest update to the at least one of the model or the features.

Aspect 18 may be combined with aspect 17 and is further characterized by determining to initiate the request for the at least one of the model or the features, where the request is transmitted to the base station based on the determination to initiate the request.

Aspect 19 may be combined with any of aspects 17-18 and is characterized in that the determination to initiate the request is based on switching from the at least one of the ML procedure or the NN procedure to at least one of a second ML procedure or a second NN procedure.

Aspect 20 may be combined with any of aspects 17-19 and is characterized in that the determination to initiate the request is based on an initialization of the at least one of the ML procedure or the NN procedure.

Aspect 21 may be combined with any of aspects 17-20 and is characterized in that the determination to initiate the request is based on a performance degradation of the UE.

Aspect 22 may be combined with any of aspects 17-21 and is further characterized by determining whether to use the at least one of the model or the features received from the base station.

Aspect 23 is an apparatus for wireless communication including at least one processor coupled to a memory and configured to implement a method as in any of aspects 1-22.

Aspect 24 is an apparatus for wireless communication including means for implementing a method as in any of aspects 1-22.

Aspect 25 is a non-transitory computer-readable medium storing computer executable code, the code when executed by at least one processor causes the at least one processor to implement a method as in any of aspects 1-22.

What is claimed is:

1. A method of wireless communication at a core network, comprising:
transmitting a request for at least one of a model or features associated with at least one of a machine learning (ML) procedure or a neural network (NN) procedure, the request transmitted via a network entity having a centralized interface between a database, at least one of a data lake or a data pond, a server, and a base station; and
receiving, via the network entity, a response to the request for the at least one of the model or the features associated with the at least one of the ML procedure or the NN procedure.

2. The method of claim 1, wherein the network entity is a model and data access coordinator (MDAC) that interfaces between the database, the at least one of the data lake or the data pond, the server, and the base station.

3. The method of claim 2, further comprising:
querying at least one of the database for a uniform resource indicator (URI) of the model or the at least one of the data lake or the data pond for the features; and
determining a status of at least one of the URI of the model or the features based on the query.

4. The method of claim 3, further comprising:
transmitting, to the server, a model update request based on the status of the URI of the model; and
receiving, from the server, an updated model based on the model update request.

5. The method of claim 4, wherein the updated model is registered in the database based on an authentication procedure for the updated model.

6. The method of claim 1, further comprising transmitting, to at least one of the base station or an access and mobility management function (AMF), the at least one of the model or the features based on the response to the request for the at least one of the model or the features.

7. The method of claim 6, wherein transmission to the at least one of the base station or the AMF is configured to initiate the at least one of the ML procedure or the NN procedure, the at least one of the ML procedure or the NN procedure being at least one of a signaling procedure or a management procedure.

8. The method of claim 6, further comprising transmitting, to a second base station, the at least one of the model or the features based on a handover of a user equipment (UE) to the second base station.

9. The method of claim 1, wherein transmission of the request for the at least one of the model or the features is initiated based on an indication from at least one of the core network, the base station, or a user equipment (UE).

10. The method of claim 1, wherein the core network corresponds to an operations, administration, and maintenance (OAM) entity.

11. A method of wireless communication at a base station, comprising:
determining to initiate a request for at least one of a model or features associated with at least one of a machine learning (ML) procedure or a neural network (NN) procedure;
transmitting the request to network entity having a centralized interface between a database, at least one of a data lake or a data pond, a server, and the base station; and receiving, the at least one of the model or the features associated with the at least one of the ML procedure from the network entity based on the request.

12. The method of claim 11, wherein the determination to initiate the request is based on at least one of an initialization of the ML procedure, an initialization of the NN procedure, or a degradation in a performance of the base station.

13. The method of claim 11, further comprising transmitting, to a user equipment (UE), a radio resource control (RRC) message indicative of the at least one of the model or the features.

14. The method of claim 13, further comprising:
receiving, from the UE based on the RRC message, a download request for the at least one of the model or the features; and
transmitting, to the UE, the at least one of the model or the features based on the download request.

15. The method of claim 13, wherein the RRC message corresponds to at least one of an RRC setup message, an RRC resume message, or an RRC reestablishment message associated with at least one of a model identifier (ID), a procedure ID, or a features metric.

16. The method of claim 13, wherein the RRC message corresponds to an RRC release message associated with at least one at a cell reselection procedure, a recorded measurement, a predicted measurement, or an idle mode procedure.

17. A method of wireless communication at a user equipment (UE), comprising:
transmitting, to a network entity having a centralized interface between a database, at least one of a data lake or a data pond, a server, and a base station, a request for at least one of a model or features associated with at least one of a machine learning (ML) procedure or a neural network (NN) procedure, the request transmitted to the network entity via the base station; and
receiving, from the network entity, the at least one of the model or the features associated with the at least one of the ML procedure or the NN procedure based on the request, the at least one of the model or the features received from the network entity via the base station.

18. The method of claim 17, further comprising determining to initiate the request for the at least one of the model or the features, wherein the request is transmitted to the base station based on the determination to initiate the request.

19. The method of claim 18, wherein the determination to initiate the request is based on switching from the at least one of the ML procedure or the NN procedure to at least one of a second ML procedure or a second NN procedure.

20. The method of claim 18, wherein the determination to initiate the request is based on an initialization of the at least one of the ML procedure or the NN procedure.

21. The method of claim 18, wherein the determination to initiate the request is based on a performance degradation of the UE.

22. The method of claim 17, further comprising determining whether to use the at least one of the model or the features received from the network entity via the base station.

23. An apparatus for wireless communication at a core network, comprising:
a memory; and
at least one processor coupled to the memory and configured to:
transmit a request for at least one of a model or features associated with at least one of a machine learning (ML) procedure or a neural network (NN) procedure, the request transmitted via a network entity having a centralized interface between a database, at least one of a data lake or a data pond, a server, and a base station; and
receive, via the network entity, a response to the request for the at least one of the model or the features associated with the at least one of the ML procedure or the NN procedure.

24. The apparatus of claim 23, wherein the network entity is a model and data access coordinator (MDAC) that interfaces between the database, the at least one of the data lake of the data pond, the server, and the base station.

25. The apparatus of claim 24, wherein the at least one processor is further configured to:
query at least one of the database for a uniform resource indicator (URI) of the model or the at least one of the data lake or the data pond for the features; and
determine a status of at least one of the URI of the model or the features based on the query.

26. The apparatus of claim 25, wherein the at least one processor is further configured to:
transmit, to the server, a model update request based on the status of the URI of the model; and
receive, from the server, an updated model based on the model update request.

27. The apparatus of claim 26, wherein the updated model is registered in the database based on an authentication procedure for the updated model.

28. The apparatus of claim 23, wherein the at least one processor is further configured to transmit, to at least one of the base station or an access and mobility management function (AMF), the at least one of the model or the features based on the response to the request for the at least one of the model or the features.

29. The apparatus of claim 28, wherein transmission to the at least one of the base station or the AMF is configured to initiate the at least one of the ML procedure or the NN procedure, the at least one of the ML procedure or the NN procedure being at least one of a signaling procedure or a management procedure.

30. The apparatus of claim 28, wherein the at least one processor is further configured to transmit, to a second base station, the at least one of the model or the features based on a handover of a user equipment (UE) to the second base station.

31. The apparatus of claim 23, wherein transmission of the request for the at least one of the model or the features is initiated based on an indication from at least one of the core network, the base station, or a user equipment (UE).

32. The apparatus of claim 23, wherein the core network corresponds to an operations, administration, and maintenance (OAM) entity.

33. An apparatus for wireless communication at a base station, comprising:
a memory; and
at least one processor coupled to the memory and configured to:
determine to initiate a request for at least one of a model or features associated with at least one of a machine learning (ML) procedure or a neural network (NN) procedure;
transmit the request to a network entity having a centralized interface between a database, at least one of a data lake or a data pond, a server, and the base station; and receive the at least one of the model or the features associated with the at least one of the ML procedure of the NN procedure from the network entity based on the request.

34. The apparatus of claim 33, wherein the determination to initiate the request is based on at least one of an initialization of the ML procedure, an initialization of the NN procedure, or a degradation in a performance of the base station.

35. The apparatus of claim 33, wherein the at least one processor is further configured to transmit, to a user equipment (UE), a radio resource control (RRC) message indicative of the at least one of the model or the features.

36. The apparatus of claim 35, wherein the at least one processor is further configured to:
receive, from the UE based on the RRC message, a download request for the at least one of the model or the features; and
transmit, to the UE, the at least one of the model or the features based on the download request.

37. The apparatus of claim 35, wherein the RRC message corresponds to at least one of an RRC setup message, an RRC resume message, or an RRC reestablishment message associated with at least one of a model identifier (ID), a procedure ID, or a features metric.

38. The apparatus of claim 35, wherein the RRC message corresponds to an RRC release message associated with at least one of a cell reselection procedure, a recorded measurement, a predicted measurement, or an idle mode procedure.

39. An apparatus for wireless communication at a user equipment (UE), comprising:
a memory; and
at least one processor coupled to the memory and configured to:
transmit, to a network entity having a centralized interface between a database, at least one of a data lake or a data pond, a server, and a base station, a request for at least one of a model or features associated with at least one of a machine learning (ML) procedure or a neural network (NN) procedure, the request transmitted to the network entity via the base station; and
receive, from the network entity, the at least one of the model or the features associated with the at least one of the ML procedure of the NN procedure based on the request, the at least one of the model or the features received from the network entity via the base station.

40. The apparatus of claim 39, wherein the at least one processor is further configured to determine to initiate the request for the at least one of the model or the features, wherein the request is transmitted to the base station based on the determination to initiate the request.

41. The apparatus of claim 40, wherein the determination to initiate the request is based on switching from the at least one of the ML procedure or the NN procedure to at least one of a second ML procedure or a second NN procedure.

42. The apparatus of claim 40, wherein the determination to initiate the request is based on an initialization of the at least one of the ML procedure or the NN procedure.

43. The apparatus of claim 40, wherein the determination to initiate the request is based on a performance degradation of the UE.

44. The apparatus of claim 39, wherein the at least one processor is further configured to determine whether to use the at least one of the model or the features received from the network entity via the base station.

45. An apparatus for wireless communication at a core network, comprising:
means for transmitting a request for at least one of a model or features associated with at least one of a machine learning (ML) procedure or a neural network (NN) procedure, the request transmitted via a network entity having a centralized interface between a database, at least one of a data lake of a data pond, a server, and a base station; and
means for receiving, via the network entity, a response to the request for the at least one of the model or the features associated with the at least one of the ML procedure or the NN procedure.

46. An apparatus for wireless communication at a base station, comprising:
means for determining to initiate a request for at least one of a model or features associated with at least one of a machine learning (ML) procedure or a neural network (NN) procedure;
means for transmitting the request to a network entity having a centralized interface between a database, at least one of a data lake or a data pond, a server, and the base station; and
means for receiving the at least one of the model or the features associated with the at least one of the ML procedure or the NN procedure from the network entity based on the request.

47. An apparatus for wireless communication at a user equipment (UE), comprising:
means for transmitting, to a network entity having a centralized interface between a database, at least one of a data lake of a data pond, a server, and a base station, a request for at least one of a model or features associated with at least one of a machine learning (ML) procedure or a neural network (NN) procedure, the request transmitted to the network entity via the base station; and
means for receiving, from the network entity, the at least one of the model or the features associated with the at least one of the ML procedure of the NN procedure based on the request, the at least one of the model or the features received from the network entity via the base station.

48. A non-transitory computer-readable medium storing computer executable code at a core network, the code when executed by at least one processor causes the at least one processor to:
transmit, a request for at least one of a model or features associated with at least one of a machine learning (ML) procedure or a neural network (NN) procedure, the request transmitted via a network entity having a centralized interface between a database, at least one of a data lake or a data pond, a server, and a base station; and
receive, via the network entity, a response to the request for the at least one of the model or the features associated with the at least one of the ML procedure of the NN procedure.

49. A non-transitory computer-readable medium storing computer executable code at a base station, the code when executed by at least one processor causes the at least one processor to:

determine to initiate a request for at least one of a model or features associated with at least one of a machine learning (ML) procedure or a neural network (NN) procedure;

transmit the request to a network entity having a centralized interface between a database, at least one of a data lake of a data pond, a server, and the base station; and receive the at least one of the model or the features associated with the at least one of the ML procedure or the NN procedure from the network entity based on the request.

50. A non-transitory computer-readable medium storing computer executable code at a user equipment (UE), the code when executed by at least one processor causes the at least one processor to:

transmit, to a network entity having a centralized interface between a database, at least one of a data lake or a data pond, a server, and a base station, a request for at least one of a model or features associated with at least one of a machine learning (ML) procedure or a neural network (NN) procedure, the request transmitted to the network entity via the base station; and receive, from the network entity, the at least one of the model or the features associated with the at least one of the ML procedure of the NN procedure based on the request, the at least one of the model or the features received from the network entity via the base station.

* * * * *